United States Patent
Agarwal

(10) Patent No.: US 11,429,663 B2
(45) Date of Patent: Aug. 30, 2022

(54) STORAGE SYSTEM AND METHOD FOR HOST-ASSISTED MEMORY BLOCK COLOR CODING FOR FASTER MEDIA SEARCH

(71) Applicant: Western Digital Technologies, Inc., San Jose, CA (US)

(72) Inventor: Dinesh Kumar Agarwal, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 171 days.

(21) Appl. No.: 16/890,270

(22) Filed: Jun. 2, 2020

(65) Prior Publication Data

US 2021/0374176 A1  Dec. 2, 2021

(51) Int. Cl.
| | |
|---|---|
| *G06F 16/00* | (2019.01) |
| *G06F 16/55* | (2019.01) |
| *G06T 1/00* | (2006.01) |
| *G06T 7/90* | (2017.01) |
| *G06F 16/583* | (2019.01) |

(52) U.S. Cl.
CPC .......... *G06F 16/55* (2019.01); *G06F 16/5838* (2019.01); *G06T 1/0007* (2013.01); *G06T 7/90* (2017.01)

(58) Field of Classification Search
CPC ....... G06F 16/55; G06F 16/5838; G06T 7/90; G06T 1/0007
See application file for complete search history.

(56) References Cited

U.S. PATENT DOCUMENTS

| | | | |
|---|---|---|---|
| 8,139,850 B2 | 3/2012 | Maxwell et al. | |
| 8,478,029 B2 | 7/2013 | Tolliver et al. | |
| 8,913,290 B2* | 12/2014 | Malik | H04N 1/46 |
| | | | 358/1.9 |
| 8,935,465 B1 | 1/2015 | Shaharabany | |
| 2002/0080998 A1* | 6/2002 | Matsukawa | G06K 9/00818 |
| | | | 382/103 |
| 2004/0126011 A1* | 7/2004 | Cheng | H04N 1/64 |
| | | | 382/164 |
| 2011/0264843 A1 | 10/2011 | Haines et al. | |
| 2013/0148883 A1* | 6/2013 | Lee | G06K 9/4652 |
| | | | 382/165 |
| 2014/0181458 A1* | 6/2014 | Loh | G06F 12/1027 |
| | | | 711/206 |

(Continued)

FOREIGN PATENT DOCUMENTS

| | | |
|---|---|---|
| AU | 2019-201268 B2 | 3/2019 |
| CN | 102905053 A | 1/2013 |

OTHER PUBLICATIONS

Gong, Y. et al.; "Image indexing and retrieval based on color histograms"; Multimedia Tools and Applications, vol. 2; Mar. 1, 1996; pp. 133-156.

(Continued)

*Primary Examiner* — Jared M Bibbee
(74) *Attorney, Agent, or Firm* — Crowell & Moring LLP

(57) ABSTRACT

A storage system and method for host-assisted memory block color coding for faster media search are provided. In one embodiment, a controller of the storage system is configured to receive an image and color properties of the image from a host and store the image in an area of memory associated with the color properties. Other embodiments are provided.

20 Claims, 9 Drawing Sheets

(56) References Cited

U.S. PATENT DOCUMENTS

| | | |
|---|---|---|
| 2015/0286581 A1 | 10/2015 | Lee |
| 2016/0011790 A1 | 1/2016 | Rostoker |
| 2016/0139812 A1 | 5/2016 | Zhang |
| 2016/0364343 A1 | 12/2016 | Case |
| 2017/0068480 A1 | 3/2017 | Huang |
| 2018/0046371 A1 | 2/2018 | Kim |
| 2020/0012595 A1 | 1/2020 | Bordia et al. |

OTHER PUBLICATIONS

Ramyad Hadidi, et al.; "Demystifying the characteristics of 3D-stacked memories: A case study for Hybrid Memory Cube"; available online at https://ieeexplore.ieee.org/document/8167757; IEEE: International Symposium on Workload Characterization (IISWC); 2017; 22 pages.

CC Hung; "Pushing the Frontier in Managing Power in Embedded ASIC or SOC Design with PCI Express"; available online at https://www.design-reuse.com/articles/17192/pci-express-managing_-power.html; 2013; 6 pages.

Non-final Office Action dated May 27, 2021 for U.S. Appl. No. 16/780,216.

International Search Report completed May 27, 2021 for International Application No. PCT/US2021/016337.

Written Opinion completed May 27, 2021 for International Application No. PCT/US2021/016337.

Israel Patent Office Search Strategy completed May 27, 2021 for International Application No. PCT/US2021/016337.

"Color histogram"; Wikipedia entry; downloaded from the Internet at https://en.wikipedia.org/wiki/Color_histogram on Nov. 22, 2019; 5 pages.

\* cited by examiner

US 11,429,663 B2

STORAGE SYSTEM AND METHOD FOR HOST-ASSISTED MEMORY BLOCK COLOR CODING FOR FASTER MEDIA SEARCH

BACKGROUND

A host with an image capture device (e.g., a mobile phone with a digital camera or a dedicated digital camera) can capture and send images to a storage system for storage. The storage system typically stores images sequentially in the memory in the order in which they are received from the host.

DETAILED DESCRIPTION

Overview

Figure 1A:
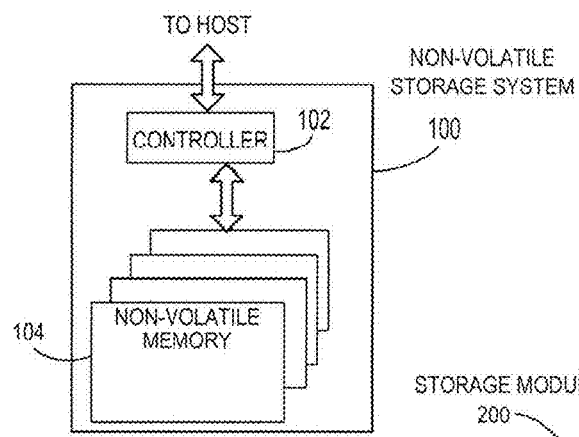
FIG. 1A is a block diagram of a non-volatile storage system of an embodiment.

By way of introduction, the below embodiments relate to a storage system and method for host-assisted memory block color coding for faster media search. In one embodiment, a storage system is provided comprising a memory and a controller. The controller is configured to receive an image and color properties of the image from a host and store the image in an area of the memory associated with the color properties.

In some embodiments, the color properties of the image are provided in a color histogram.

In some embodiments, the controller is further configured to designate a plurality of areas of the memory with respective color codes.

In some embodiments, the controller is further configured to identify the area of the memory to store the image by matching the color properties of the image with the color code of the area of the memory.

In some embodiments, the plurality of areas of the memory comprises blocks.

In some embodiments, the plurality of areas of the memory comprises wordlines.

In some embodiments, the controller is further configured to store images with similar color properties across multiple memory dies or channels of the memory.

In some embodiments, the controller is further configured to inform the host of a plurality of stored images with similar color properties.

In some embodiments, the memory comprises a three-dimensional memory.

In another embodiment, a method is provided that is performed in a host in communication with a storage system comprising a memory. The method comprises: determining color properties associated with an image; and sending the image and the determined color properties of the image to the storage system for storage in an area of the memory associated with the color properties.

In some embodiments, the color properties of the image are provided in a color histogram.

In some embodiments, the method further comprises receiving information from the storage system regarding a plurality of stored images with similar color properties.

In some embodiments, the method further comprises grouping the plurality of stored images together for compression.

In another embodiment, a storage system is provided comprising a memory and means for storing an image in a region of the memory associated with color characteristics of the image.

In some embodiments, the color characteristics of the image are provided in a color histogram.

In some embodiments, the storage system further comprises means for marking a plurality of regions of memory with respective color codes.

In some embodiments, the storage system further comprises means for choosing the region of the memory to store the image by matching the color characteristics of the image with the color code of the region of the memory.

In some embodiments, the storage system further comprises means for storing images with similar color characteristics across multiple memory dies or channels of the memory.

In some embodiments, the storage system further comprises means for informing the host of a plurality of stored images with similar color characteristics.

In some embodiments, the memory comprises a three-dimensional memory.

Other embodiments are possible, and each of the embodiments can be used alone or together in combination. Accordingly, various embodiments will now be described with reference to the attached drawings.

EMBODIMENTS

Figure 1B:
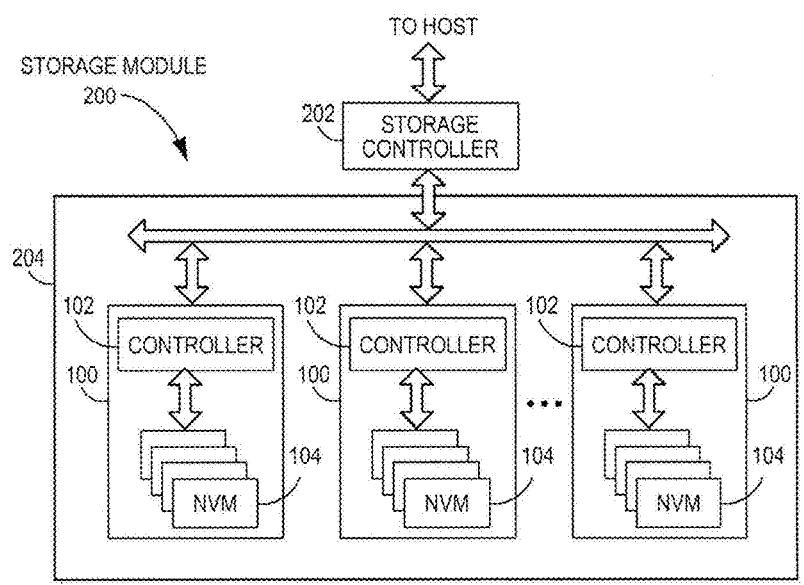
FIG. 1B is a block diagram illustrating a storage module of an embodiment.
Figure 1C:
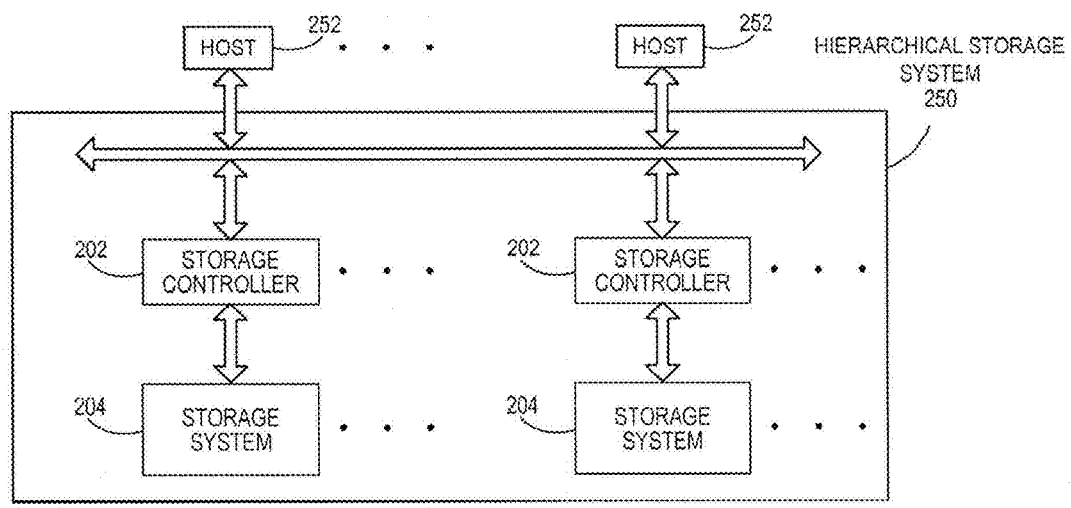
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
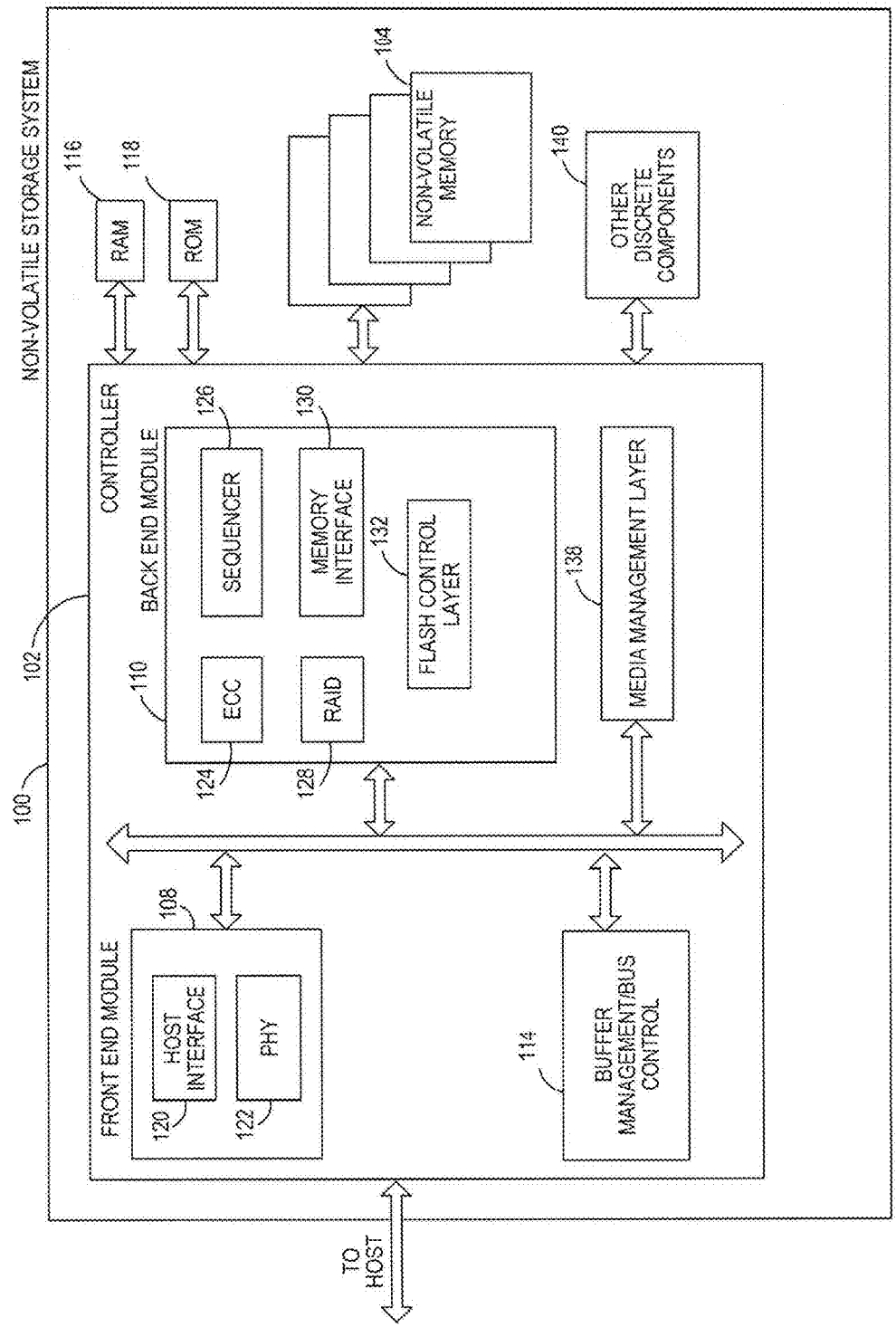
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 can be implemented in hardware and/or software (e.g., in a processor executing computer-readable program code) to implement the methods and algorithms described below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
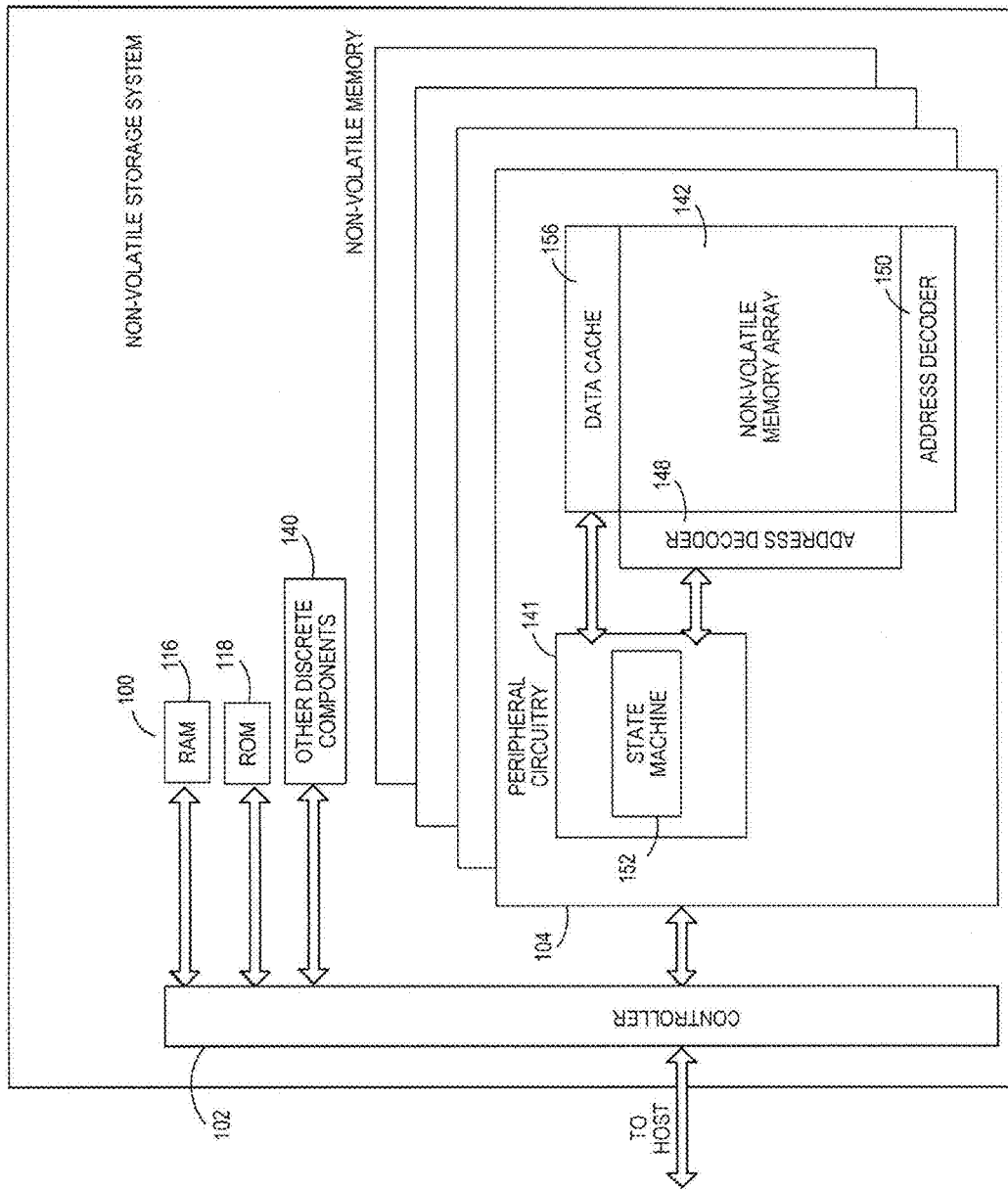
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
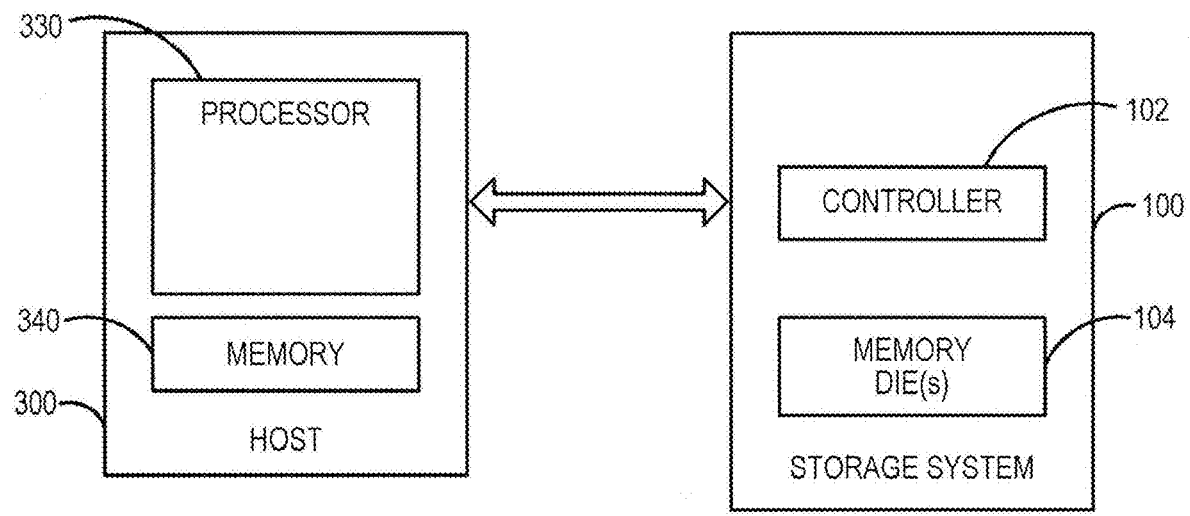
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. In one embodiment, the host 300 comprises an image capture device 390 (e.g., a camera) to take a picture, and the processor 330 generates a digital image representing that picture. The image can be stored in the memory 340 prior to sending the image to the storage system 100 (e.g., a memory card or an embedding storage device) for storage.

Figure 4:
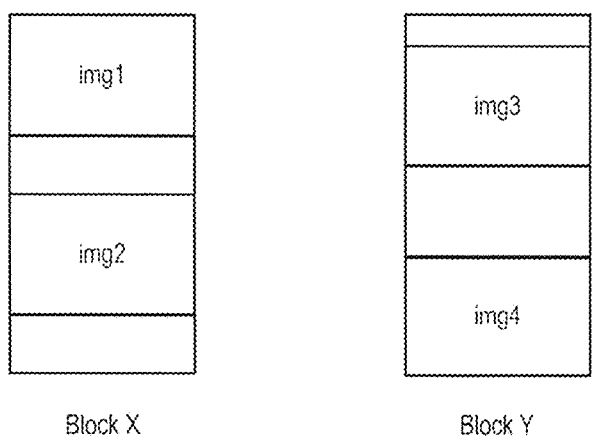
FIG. 4 is an illustration of a sequential image storage method.

As mentioned above, a host with an image capture device (e.g., a mobile phone with a digital camera or a dedicated digital camera) can capture and send images to a storage system for storage. The storage system typically stores images sequentially in the memory in the order in which they are received from the host. However, the host can read any set of images in any order. With increasing storage system (e.g., card/drive/solid-state drive (SSD)) capacity, the time to access the memory (media) becomes increasingly important. If images are not organized properly in the memory, access to the images can be become serial, which is time consuming. For example, as shown in FIG. 4, images received from a host that are stored sequentially over two blocks in memory may not be optimal for future host reads.

The following embodiments can be used to organize images in the memory better from the start of media writes by storing similar images in a similar set of blocks. This makes it easier to later access the content at a faster rate, and the properties used to identify which areas of memory to store the images can be utilized by various applications to optimize usage of the storage system.

In general, in this embodiment, the controller 102 of the storage system 100 marks units of memory (e.g., blocks) with a color code. When providing an image to the storage system 100 for storage in the memory 104, the host 300 also provides color characteristics or properties of the image. The color characteristics or properties can be presented in a color histogram, which is a representation of the distribution of colors in an image. For a digital image, a color histogram can represent the number of pixels that have colors in each of a fixed list of color ranges that span the image's color space (i.e., the set of all possible colors). While a color histogram will be used in the below examples, it should be understood that color characteristics or properties can be presented in other ways.

The controller 102 in the storage system 100 then identifies a block in the memory 104 to store the image by searching blocks whose color code matches the image's color properties. The match can be an exact match or a match within a certain tolerance level. The controller 102 then routes and stores the image in the corresponding set of color coded blocks. In this way, a set of blocks is marked with a certain color code will contain images with a matching color code. As will be discussed in more detail below, the controller 102 can store images with similar content/color codes across multiple dies/channels in the memory 104 to provide parallelism for future usage.

The following paragraphs described one example implementation of these embodiments for utilizing color properties of an image to organize the images in memory; specifically, by using host-provided color hints to route images to blocks with the best-matching color code. It should be understood that this is merely an example, and other implementations can be used.

Figure 5:
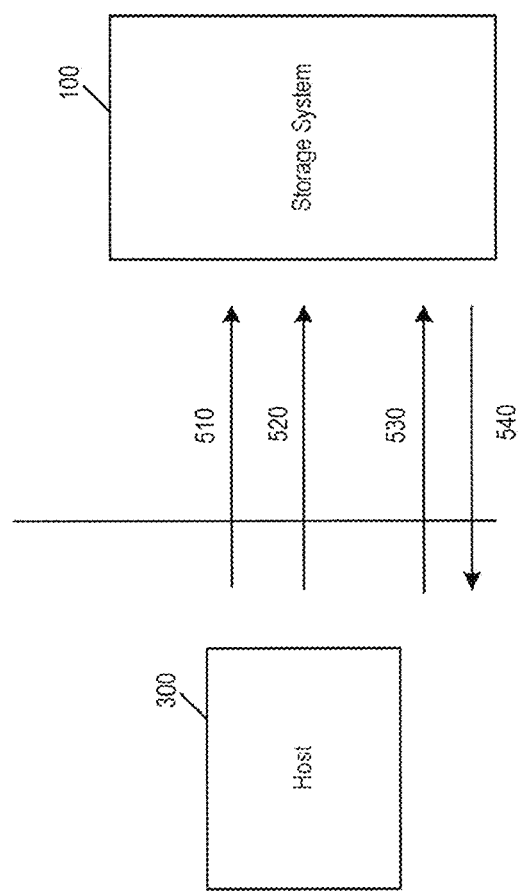
FIG. 5 is a block diagram of a host and storage system of an embodiment that illustrates a method for host-assisted memory block color coding for faster media search.

Returning to the drawings, FIG. 5 is a block diagram of a host 300 and storage system 100 of an embodiment for host-assisted memory block color coding for faster media search. As shown in FIG. 5, when the host 300 sends an image to the storage system 100 for storage (act 510), the host 300 also provides an indication about the color properties (e.g., a color histogram) of the image (act 520). The controller 102 in the storage system 100 uses this indication to store the image in the appropriate block in the memory 104. Later, an application in the host 300 sends a request to the storage system 100 to retrieve the image. In response, the controller 102 retrieves the image from the memory 104 and provides it to the host 300 (act 540). As will be discussed in more detail below, the controller 102 can perform predictive loading in parallel and send a hint to the host 300. For example, when the storage system 100 has multiple sets of images with similar content/color properties, optionally, it can notify the host 300 to take some action.

Figure 6:
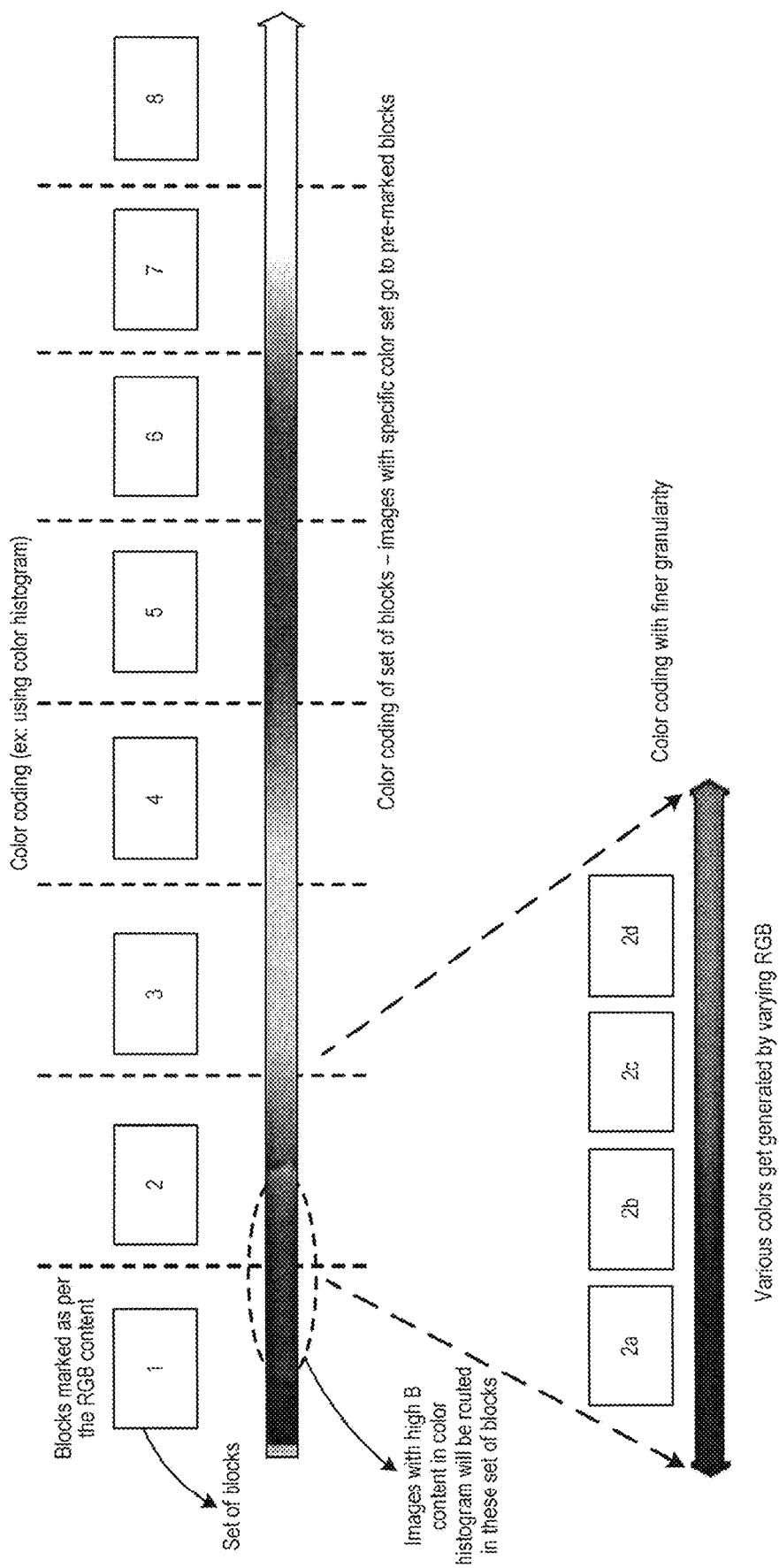
FIG. 6 is an illustration of a memory block color coding process of an embodiment.

As mentioned above, in one embodiment, the controller 102 of the storage system 100 color codes blocks of the memory 104. FIG. 6 illustrates an example color coding process. As shown in FIG. 6, in this example, for each block, the color property keeps varying. If the memory 104 has a large number of blocks, then color coding can be done at a very-fine granularity for better prediction. For example, the granularity can go to the wordline level. However, managing color coding at the block level may be easier if it is the erase unit of the memory 104.

Figure 7:
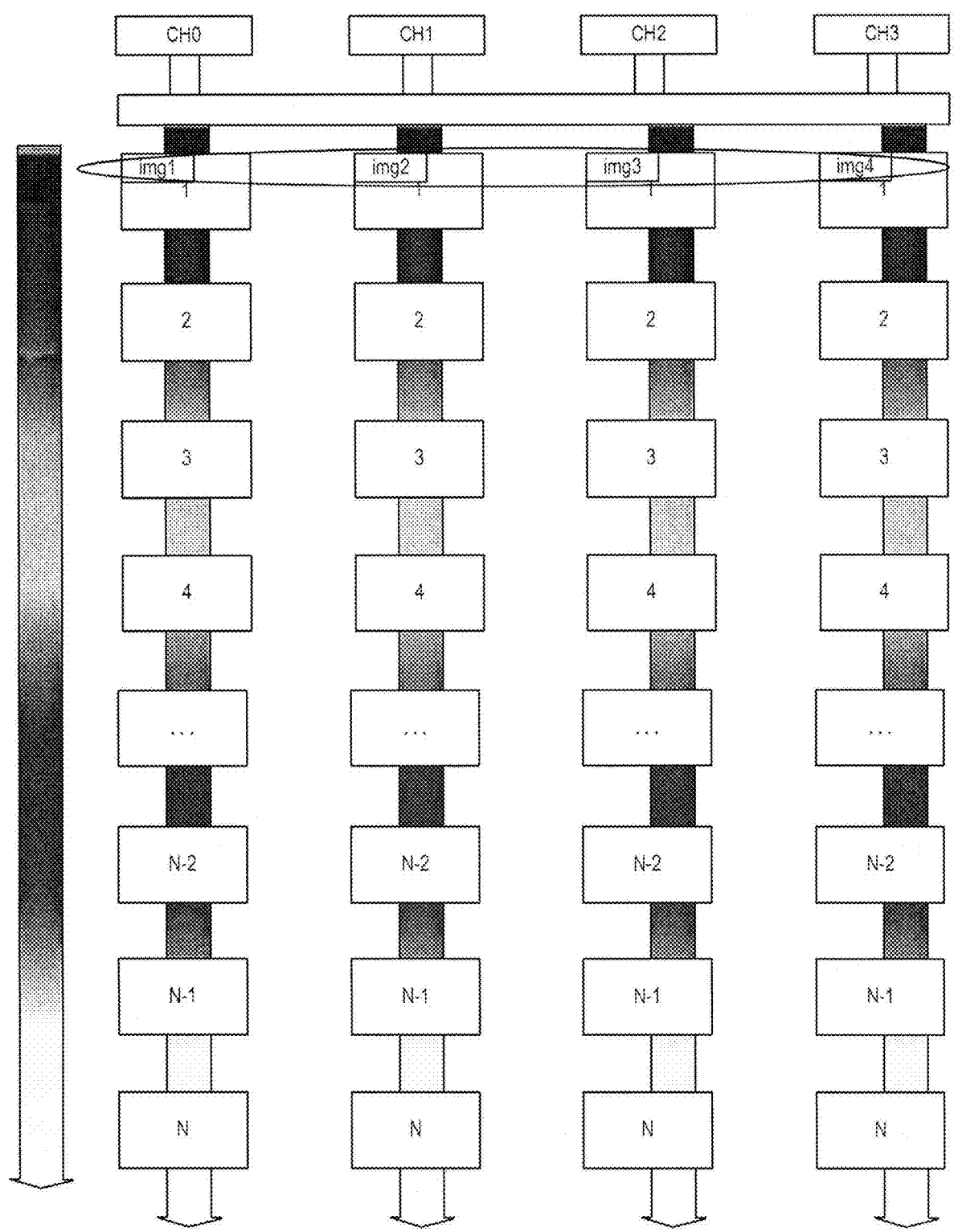
FIG. 7 is an illustration of a method of an embodiment for storing multiple images with similar color characteristics across multiple dies/channel in memory.

As also mentioned above and as shown in FIG. 7, when multiple images with similar color characteristic are written to the memory 104, the image can be written across multiple dies/channel in the memory 104 in anticipation that these images will be later requested simultaneously. By writing the images to provide for maximum parallelism, the storage system 100 can send the images to the host 300 with minimal latencies. An example of this is discussed in more detail below.

Figure 8A:
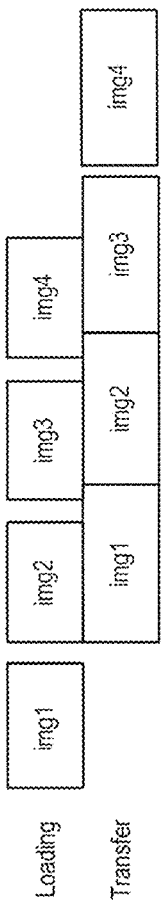
FIG. 8A is an illustration of a serial storage and retrieval mechanism.
Figure 8B:
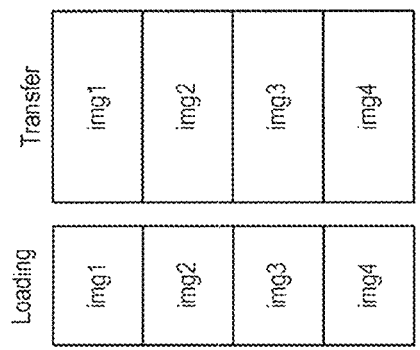
FIG. 8B is an illustration of a parallel storage and retrieval mechanism of an embodiment.

As can be seen by the above example, utilizing the color properties of an image and routing the image to the appropriate blocks in the memory 104 organizes the images better in the memory 104 for faster host access. FIGS. 8A and 8B are diagrams that illustrate this comparison. FIG. 8A is an illustration of a serial storage and retrieval mechanism. As shown in FIG. 8A, images 1-4 are stored serially in the memory. Thus, when the images are retrieved, they are transferred to the host serially. This requires a relatively long time. FIG. 8B is an illustration of a parallel storage and retrieval mechanism of an embodiment. As shown in FIG. 8B, images having similar color characteristics are stored together and across memory dies/channels. This allows for parallel loading and transfer, which provides faster access than the serial method.

There are several advantages associated with these embodiments. For example, these embodiments can be extended to multiple media types by using similar properties and are applicable for mixed content as well as where a specific set of blocks are used for media, and other blocks can be used normally.

Once the host 300 knows about the similar content, it can use a hint provided by the storage system 100 to perform an image search better and can apply more complex algorithms for compression and other similar applications. For example, regarding faster image search for similar content, as shown in the above example, if img1 to img4 were stored randomly, loading and transfer time is very high. So, by storing images with the method of these embodiments, the storage system 100 can transfer data at a faster rate Further, generally speaking, the browsing of images also involves loading similar images to display next to each other, so the accelerated loading benefit can make that user experience better. Also, as noted above, these embodiments can provide better compression. If the host 300 wants to compress images, the storage system 100 can provide the host 300 with a hint regarding which images can be clubbed for better compression. Additionally, these embodiments can provide an image recovery mechanism. For example, if multiple dies store similar images, a similar image can be used from another die if one of the dies fails.

There are several alternatives that can be used with these embodiments. For example, if for some images, the color information from the host is not available at write time, these images can be written at a temporary location and can be routed to the appropriate blocks in the background when the information is available either via the host, or the device can itself determine it. The same is true if there is not enough space blocks available in the appropriate color coded blocks. In another alternative, the color coding of the blocks is not fixed and can be changed dynamically based on device usage. For instance, if one color-specific image is written more than others, more blocks can be allocated to cover that range.

Finally, as mentioned above, any suitable type of memory can be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller configured to:
designate a plurality of areas of the memory with respective color codes:
receive an image and color properties of the image from a host;
identify an area of the memory to store the image by matching the color properties of the image with a color code of the area of the memory; and
store the image in the identified area of the memory.

2. The storage system of claim 1, wherein the color properties of the image are provided in a color histogram.

3. The storage system of claim 1, wherein the plurality of areas of the memory comprises blocks.

4. The storage system of claim 1, wherein the plurality of areas of the memory comprises wordlines.

5. The storage system of claim 1, wherein the controller is further configured to store images with similar color properties across multiple memory dies of the memory.

6. The storage system of claim 1, wherein the controller is further configured to inform the host of a plurality of stored images with similar color properties.

7. The storage system of claim 1, wherein the memory comprises a three-dimensional memory.

8. A method comprising:
performing the following in a host in communication with a storage system comprising a memory:
determining color properties associated with an image; and
sending the image and the determined color properties of the image to the storage system for storage, wherein the storage system is configured to designate a plurality of areas of the memory with respective color codes and identify an area of the memory to store the image by matching the determined color properties of the image with a color code of the area of the memory.

9. The method of claim 8, wherein the color properties of the image are provided in a color histogram.

10. The method of claim 8, further comprising receiving information from the storage system regarding a plurality of stored images with similar color properties.

11. The method of claim 10, wherein the storage system is further configured to group the plurality of stored images together for compression.

12. A storage system comprising:
a memory;
means for marking a plurality of regions of the memory with respective color codes;
means for choosing a region of the memory to store an image by matching color characteristics of the image with a color code of the region of the memory; and
means for storing the image in the region of the memory.

13. The storage system of claim 1, wherein the controller is further configured to store images with similar color properties across multiple channels of the memory.

14. The storage system of claim 1, wherein the controller is further configured to receive a grouped plurality of images.

15. The storage system of claim 14, wherein the controller is further configured to compress the grouped plurality of images.

16. The method of claim 8, wherein the plurality of areas of the memory comprises blocks.

17. The method of claim 8, wherein the plurality of areas of the memory comprises wordlines.

18. The method of claim 8, wherein images with similar color properties are stored across multiple memory dies of the memory.

19. The method of claim 8, wherein images with similar color properties are stored across multiple channels of the memory.

20. The method of claim 8, wherein the memory comprises a three-dimensional memory.

* * * * *